Feb. 10, 1970

U. N. HENSLEY 3,494,246

COMPRESSION LOCKING TUBULAR RIVET

Filed May 22, 1968

URBAN N. HENSLEY
*INVENTOR*

BY

*Robert K. Rhea*
AGENT

United States Patent Office 3,494,246
Patented Feb. 10, 1970

3,494,246
COMPRESSION LOCKING TUBULAR RIVET
Urban N. Hensley, Rte. 1, Box 55,
Donnellson, Ill. 62019
Filed May 22, 1968, Ser. No. 731,120
Int. Cl. F16b 19/08
U.S. Cl. 85—39                          1 Claim

ABSTRACT OF THE DISCLOSURE

A one-piece tubular rivet cap has its outer wall centrally upset laterally to form a conical surface. An inner wall is joined to the outer edge of the outer wall by a reverse bend to form an annular space around the base of the conical surface. A cylindrical wall extends from the back wall coaxial with respect to the conical surface for guiding the wall of a tubular rivet toward the conical surface which spreads the wall of the tubular rivet into the annular recess by a compressive force against the rivet head and outer wall of the cap.

BACKGROUND OF THE INVENTION

The present invention relates to fastening devices and more particularly to an improved cap for locking tubular rivets when securing two or more layers of material.

A tubular rivet and cap is disclosed by the patent to Bray No. 686,932 which features means for spreading and dividing the wall of the rivet along predetermined lines, however, this patent does not provide a means for the compression locking of the rivet after being spread as does the cap of my invention.

SUMMARY OF THE INVENTION

A one-piece tubular rivet cap is formed with an outer end wall having its central portion laterally upset to define a conical surface. A back wall is joined to the outer edge of the front wall by a reverse bend to form an annular recess around the base of the conical surface. A cylindrical wall is joined in hub-like fashion to the back wall coaxial with respect to the base portion of the conical surface which receives and guides the tubular end of a tubular rivet toward the conical surface to flare the wall of the rivet outwardly into the annular recess. The flared rivet wall is impinged between the outer and back wall of the cap by a compression force longitudinally applied to the cylindrical wall.

The principal object of the invention is to provide a cap for compression locking of tubular rivets.

DESCRIPTION OF THE PREFERRED EMBODIMENTS

Figure 1:
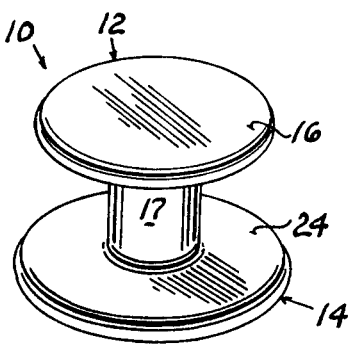
FIGURE 1 is a perspective view of the assembled fastening device, per se.
Figure 2:
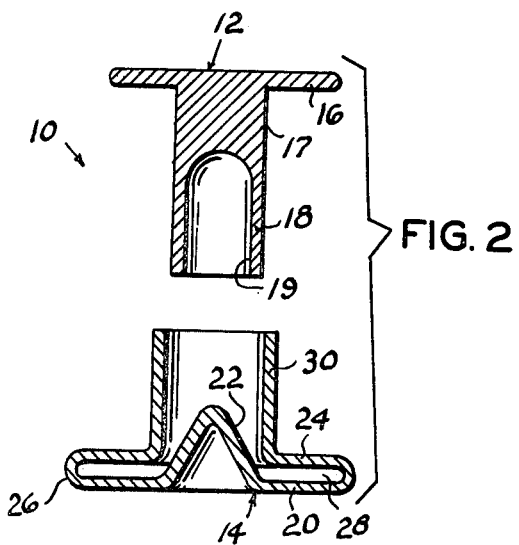
FIGURE 2 is an exploded vertical cross-sectional view of the fastening device.

The reference numeral 10 indicates the fastening device, as a whole, comprising a tubular rivet 12 and a locking cap 14. The rivet 12 is substantially conventional having a head portion 16 and a coaxially connected shank 17 terminating in a tubular portion 18 defined by a bore 19. The cap 14 is formed of one-piece sheet material to define an outer wall 20 diametrically substantially equal with respect to the annular flange forming the rivet head 16 and having a central laterally upset portion defining a conical surface 22 at one side of the outer wall 20. The base diameter of the conical surface is substantially equal to the outside diameter of the tubular portion 18 of the rivet for the purposes presently explained.

Figure 4:
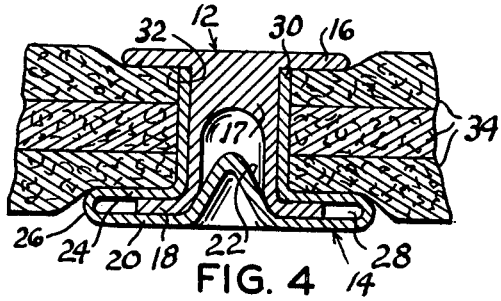

The cap 14 is further characterized by a back wall 24 which is joined to the outer limit of the outer wall 20 by a reverse bend 26 in a double-back-upon-itself fashion forming an annular space or recess 28 between the outer and back walls 20 and 24, respectively, around the base of the conical surface 22. The cap 14 further includes a hub-like cylindrical wall 30 which is joined to the back wall 24 and having an inside diameter equal to or slightly greater than the outside diameter of the rivet tubular portion 18. Longitudinally the length of the cylindrical wall 30 is of a desired length, such that it is substantially equal to or slightly less than the thickness of layers of material to be joined, so that the latter will be compressed and securely fastened, as shown by FIG. 4. Obviously the length of the rivet shank 17 must be greater than the length of the cylindrical hub 30. The depth of the rivet bore 19 forming a tubular shank end portion should be at least equal to the height of the conical surface and the radial distance of the recess 28.

OPERATION

Figure 3:
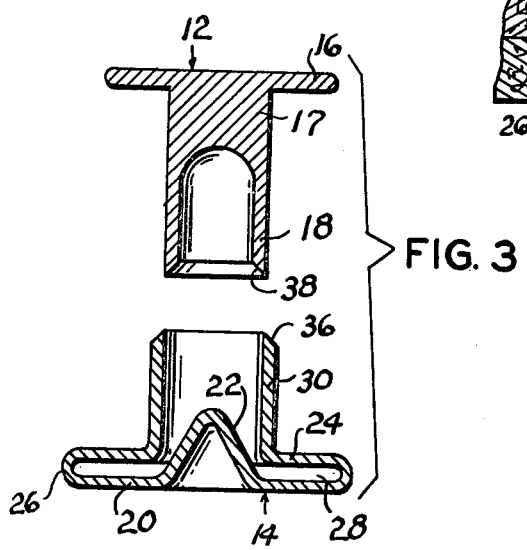
FIGURE 3 is a view similar to FIG. 2 illustrating an alternative embodiment; and, FIGURE 4 is a fragmentary vertical cross-sectional view through the assembled fastening device securing layers of material.

In operation the cylindrical hub 30 of the cap 14 is inserted into a preformed aperture or hole, indicated at 32, in layers of material 34 to be joined together. The rivet 12 is inserted into the open end of the hub 30 and compressive force, by any suitable means, not shown, is applied to the outwardly disposed end surface of the rivet 12 and cap 14 which forces the wall of the tubular shank 18 against the base portion of the conical surface 22. The conical surface 22 flares and guides the conical wall 18 of the tubular rivet in an outward direction into the recess 28. When the rivet 12 has been fully inserted into the cap 14, further compressive force against the rivet 12 and cap 14 impinges the cylindrical wall 30 between the rivet head 16 and the outer wall 20 of the cap thus forcing the back wall 24 against the outwardly flared portion of the rivet wall 18 within the recess 28, to clamp the rivet wall therein. If desired, and as shown in FIG. 3, the free end surface of the cylindrical wall 30 may be beveled or sharpened, as at 36, to form a cutting surface in combination with a similar but oppositely beveled surface 38 formed on the free end of the tubular wall portion 18 of the rivet. The rivet 12 and its cap 14 may then be forced toward each other in cooperative relation to form its own hole or aperture when used in joining relatively soft layers of material.

Obviously the invention is susceptible to some change or alteration without defeating its practicability, and I therefore do not wish to be confined to the preferred embodiment shown in the drawings and described herein.

I claim:

1. A cap of one-piece sheet metal construction for a tubular rivet, comprising: a front wall having an outer surface and having a central conical recess forming a conical surface having a base portion opposite said outer surface; a back wall parallel with and joined to the outer edge of the front wall by a reverse bend forming a hollow rim section extending radially outward from the base portion of said conical surface; a cylindrical wall extending from the inner portion of said back wall coaxial with respect to said conical surface and having an open end, the inside diameter of said cylindrical wall being substantially equal with respect to the diameter of the base of said conical surface, the free end of said cylindrical wall having an outer beveled surface forming a cutting edge at the inner surface of the cylindrical wall; and, a rivet having a shank portion slidably received by said cylindrical wall and a tubular shank end portion longitudinally greater than the height of said conical surface and having an imperforate head end defined by an annular flange for limiting the movement of the rivet into the cap by contact with the rivet head, the free end of said tubular shank portion having an inner beveled surface forming a cutting edge at the outer surface of the tubular shank portion, whereby pressure joining said cap and rivet forces the tubular end portion of said rivet into the hollow rim section and impinges the rivet wall between the back wall inner portion and the front wall surface adjacent the base of said conical surface.

References Cited

UNITED STATES PATENTS

| | | | |
|---|---|---|---|
| 62,001 | 2/1867 | Capewell | 24—95 |
| 490,436 | 1/1893 | Hall | 24—217 |
| 576,905 | 2/1897 | Shipley | 24—95 |
| 1,577,079 | 3/1926 | Ross et al. | 24—95 |
| 1,885,816 | 11/1932 | Ford | 24—220 |

EDWARD C. ALLEN, Primary Examiner

U.S. Cl. X.R.

24—95